United States Patent

Bellegarda et al.

[11] Patent Number: 5,502,774
[45] Date of Patent: Mar. 26, 1996

[54] AUTOMATIC RECOGNITION OF A CONSISTENT MESSAGE USING MULTIPLE COMPLIMENTARY SOURCES OF INFORMATION

[75] Inventors: Jerome R. Bellegarda, Goldens Bridge; Dimitri Kanevsky, Ossining, both of N.Y.

[73] Assignee: International Business Machines Corporation, Armonk, N.Y.

[21] Appl. No.: 300,232

[22] Filed: Sep. 6, 1994

Related U.S. Application Data

[63] Continuation of Ser. No. 895,967, Jun. 9, 1992, abandoned.

[51] Int. Cl.$^6$ ................................................ G06K 9/00
[52] U.S. Cl. .................... 382/159; 382/116; 382/187; 382/228; 381/43
[58] Field of Search .................... 381/1, 2, 3, 13, 381/14, 15, 30, 36, 38, 7, 39, 116, 157, 159, 187, 227, 228; 381/41, 43; 340/825.3

[56] References Cited

U.S. PATENT DOCUMENTS

| | | | |
|---|---|---|---|
| Re. 31,692 | 10/1984 | Tyhurski et al. | 382/7 |
| 3,192,321 | 6/1965 | Nassimbene | 179/1 |
| 4,348,553 | 9/1982 | Baker et al. | 179/15 B |
| 4,481,593 | 11/1984 | Bahler | 364/513.5 |
| 4,731,857 | 3/1988 | Tappert | 382/9 |
| 4,754,489 | 6/1988 | Bokser | 382/36 |
| 4,829,577 | 5/1989 | Kuroda et al. | 381/45 |
| 4,876,731 | 10/1989 | Loris et al. | 382/46 |
| 4,975,960 | 12/1990 | Petajan | 381/43 |
| 4,993,068 | 2/1991 | Piosenka et al. | 380/23 |
| 5,159,644 | 10/1992 | Martin et al. | 382/15 |
| 5,212,821 | 5/1993 | Gorin et al. | 382/15 |

FOREIGN PATENT DOCUMENTS 2229305  9/1990  United Kingdom ............ A61B 5/117

*Primary Examiner*—Leo Boudreau
*Assistant Examiner*—David R. Anderson
*Attorney, Agent, or Firm*—Sterne, Kessler, Goldstein & Fox

[57] ABSTRACT

A general approach is provided for the combined use of several sources of information in the automatic recognition of a consistent message. For each message unit (e.g., word) the total likelihood score is assumed to be the weighted sum of the likelihood scores resulting from the separate evaluation of each information source. Emphasis is placed on the estimation of weighing factors used in forming this total likelihood. This method can be applied, for example, to the decoding of a consistent message using both handwriting and speech recognition. The present invention includes three procedures which provide the optimal weighing coefficients.

28 Claims, 7 Drawing Sheets

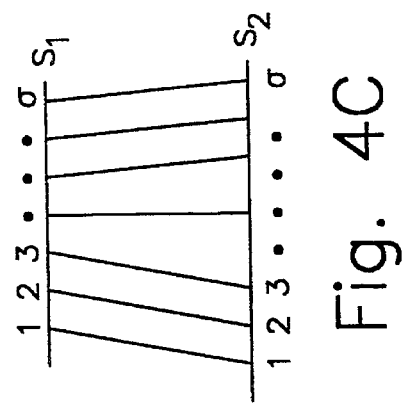
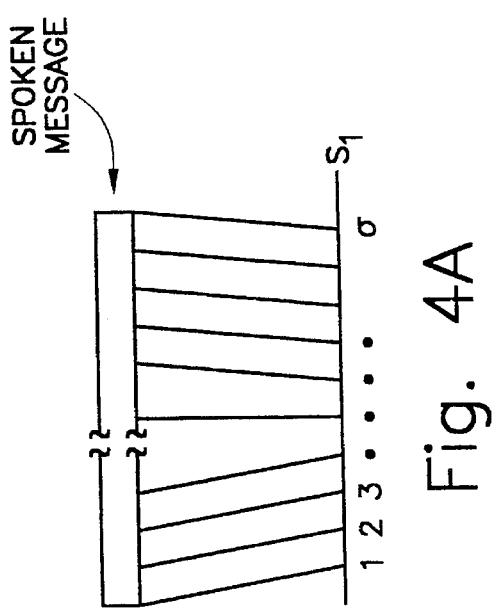
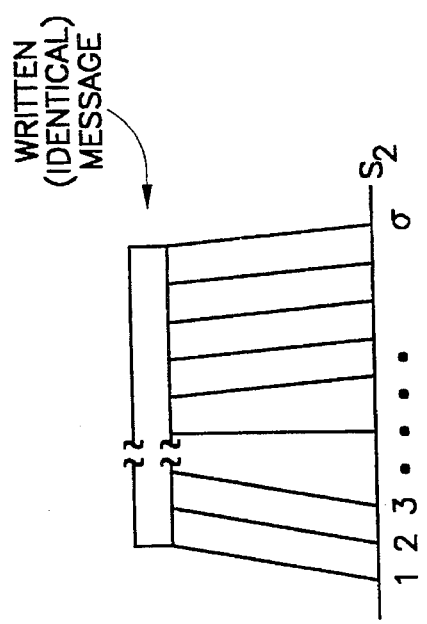

1

AUTOMATIC RECOGNITION OF A CONSISTENT MESSAGE USING MULTIPLE COMPLIMENTARY SOURCES OF INFORMATION

This application is a continuation, of application Ser. No. 07/895,967, filed Jun. 9, 1992, now abandoned.

TECHNICAL FIELD

The present invention relates generally to the field of message recognition, and more particularly, to a system and method for using several sources of information in the automatic recognition of a consistent message.

BACKGROUND ART

The simultaneous use of multiple sources of information is known to improve the performance of identity recognition systems. For example, it was shown in UK Patent GB 2,229,305 A to Fleming that verification procedures used to identity an individual can be strengthened by the use of multiple biometric inputs. The Fleming disclosure describes an identity verification system based on collecting, through appropriate biometric tests, various user specific characteristics (e.g., face, fingerprint, and voice characteristics), and combining the results of these tests through a weighted sum of each individual score.

The recognition of a person, however, is quite different from the recognition of a message conveyed by that person. Even though voice and/or handwriting inputs, for example, may be used in both cases, user identification requires only a relatively short voice pattern (such as a password), or a relatively concise handwriting pattern (such as a signature), for the sole purpose of ascertaining the identity of the user. A user identification procedure typically must compare the evidence provided by the user to a unique set of templates stored for this user. A score is assigned to the evidence and a comparison of the score to a threshold is performed. The comparison is either successful or unsuccessful (i.e., this is a binary decision).

In contrast, message recognition is a far more complex task. Message recognition generally requires long utterances or a substantial amount of handwriting, involving complex syntactic and semantic structures constructed from a large vocabulary of words. The output of a message recognizer is a sequence of words representing the message being created. A message recognition procedure typically consists of decoding the current set of input data (such as, for example, the utterance spoken for the current word or the sequence of characters handwritten for the current word) by comparing the input against a plurality of potential candidate words in the vocabulary. Each candidate word must be assigned a score, and the decoded word is determined by which score is the highest.

Of particular interest are procedures for adjusting internal parameters used by the recognition system to the characteristics of each individual user. As described in F. Jelinek, "The Development of an Experimental Discrete Dictation Recognizer" Proc IEEE, Vol 73, No 11, pp 1616–1624 (November 1985), this adjustment, called training, has the potential to improve the accuracy performance during recognition (also referred to as decoding).

Moreover, the simultaneous use of multiple sources of information is known to improve the performance of automatic message recognition systems. For example, it was demonstrated in U.S. Pat. No. 3,192,321 to Nassimbene and E. D. Petajan, "Automatic Lipreading to Enhance Speech Recognition" IEEE Trans Acoust, Speech, Signal Processing, Vol. ASSP-33, No 1, pp. 40–47, (January 1985), that using lipreading information can enhance automatic speech recognition. However, the procedures used in these disclosures provide a trivial straightforward strategy and are based on a simple comparison of output words from an automatic speech recognizer and automatic lipreading recognizer.

Finally, it was shown in U.S. patent application Ser. No. 07/676,601 filed Mar. 28, 1992, and now abandoned naming J. Bellegarda and D. Kanevsky as co-inventors, and entitled "Improved Message Recognition through the Integration of Speech and Handwriting Information," which is hereby incorporated by reference in its entirety herein, that the integration of speech and handwriting information can lead to the improved recognition of a consistent message. This application addresses the problem of merging the evidence obtained from two sources during decoding, but not during training.

As sensor technology develops, it is likely that in the near future, more and more measurements from many different sources of information will be available to the automatic message recognition system. The challenge is therefore to integrate the evidence provided by these many sources to perform more accurate and robust decoding.

Thus, given the fundamental difference between identification of an individual and identification of a consistent message, which makes it clear that the same procedure cannot be used in both cases, and the demonstrated ability of multiple sources of information to improve the performance of a recognition system, it is readily apparent that a procedure for using multiple sources of information in the automatic recognition of a consistent message is needed.

DISCLOSURE OF THE INVENTION

The present invention provides a general approach for the combined use of several sources of information in the automatic recognition of a consistent message. For each message unit (e.g., word) the total likelihood score is assumed to be the weighted sum of the likelihood scores resulting from the separate evaluation of each information source. Emphasis is placed on the estimation of weighting factors used in forming this total likelihood. This method can be applied, for example, to the decoding of a consistent message using both handwriting and speech recognition. The present invention comprises three procedures which provide the optimal weighting coefficients.

BRIEF DESCRIPTION OF DRAWINGS

The foregoing and other features and advantages of the invention will be apparent from the following more particular description of preferred embodiments of the invention, as illustrated in the accompanying drawings, in which:

FIGS. 4a through 4c illustrate an example of a warping of two distinct messages $S_1$ and $S_2$.

BEST MODE FOR CARRYING OUT THE INVENTION

Figure 1:
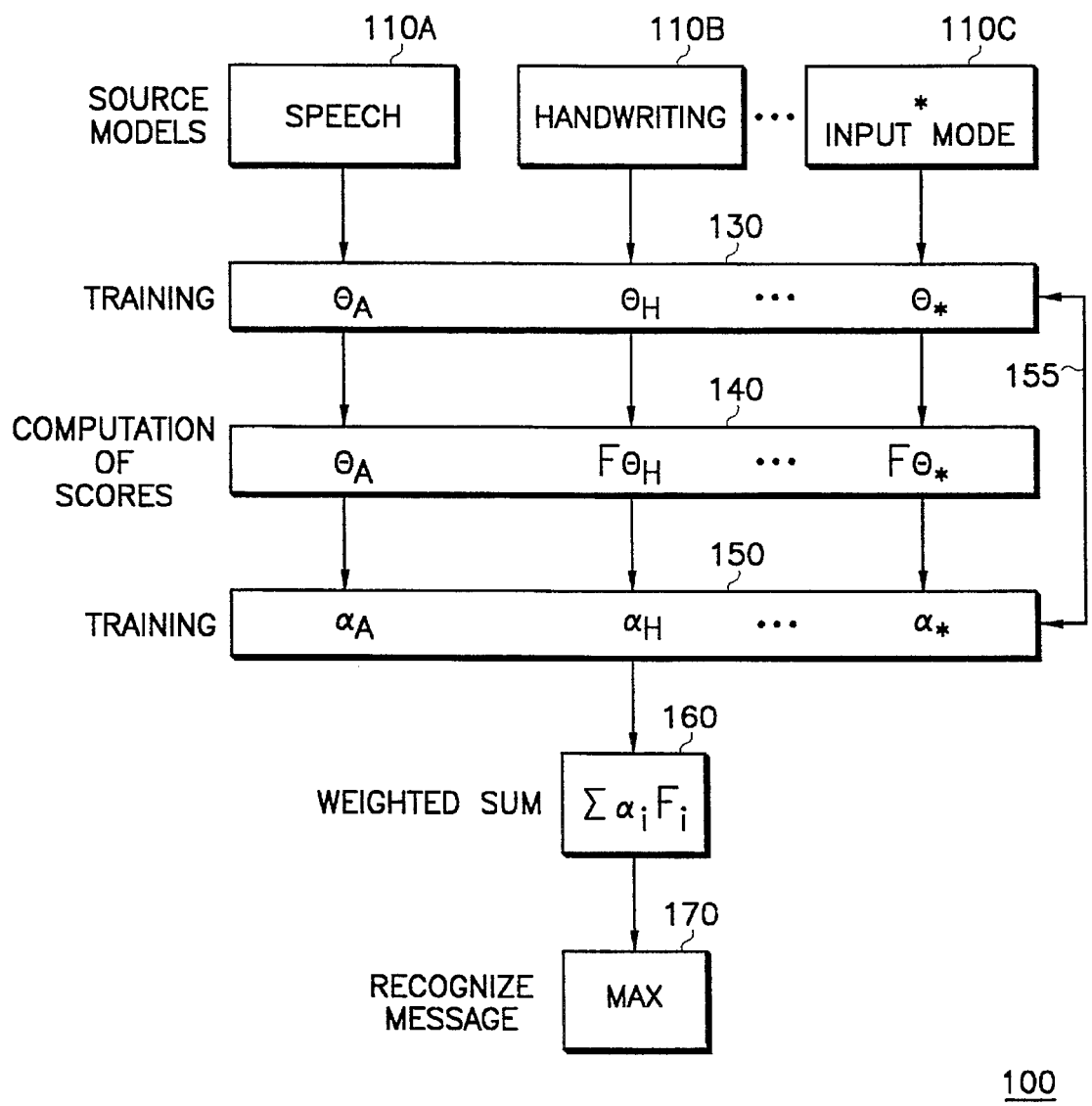
FIG. 1 is a general block diagram of a message recognition system.

FIG. 1 illustrates a message recognition system 100, constructed and operated in accordance with a preferred embodiment of the present invention, for the automatic recognition of a consistent message. The present invention provides a system and method for combining multiple sources of information (e.g., voice print, written word, facial movement from one or more users, gestures, typing) in order to recognize a consistent message. For each sub-message unit, such as a word, the present invention forms the total likelihood score as the weighted sum of several likelihood scores, one for each distinct source of information. Recognition is based on the maximization of this total likelihood (i.e., a maximum a posteriori decoding scheme is implemented). Specifically, procedures are provided for implementing a training strategy which yields the optimal weighting coefficients for a given set of circumstances.

As employed herein, a message is considered to be information generated by a human subject. The information is entered into the system 100 through, for example, an acoustic signal, a handwritten stroke signal, a signal from a lipreading device, a signal from a steno device, or through a combination of such signals. The information may represent individual characters, including numbers, letters of the alphabet, punctuation and the like. The information may also represent words, phrases, and paragraphs.

As employed herein the expression "consistent message" means the same message treated by several different recognition procedures, either simultaneously or otherwise. In other words, the meaning of the material gathered at each source of information has to be identical. Consequently, since the present invention only requires consistency in the message being created, the present invention is able to consider a situation where, for example, the spoken data would be provided by one user (e.g., an executive dictating a memo) and the handwritten data would be provided by another (e.g., a secretary correcting errors just made). Moreover, the present invention can accept as an input a consistent message spoken by two different speakers.

Referring in detail to FIG. 1, blocks 110a, 110b, 110c indicate different source models of information. They consist of information of each source and the training device that receives and operates the corresponding source of information. As such, blocks 110a, 110b, 110c indicate that multiple sources of information can be used as an input to the recognition system 100. The information can come from a speech source model 110a, a handwriting source model 110b, or any other source model (labeled ★) 110c that can provide a consistent message to system 100 (e.g., facial movements, touch patterns, brain impulses).

In accordance with the invention there is provided an integrated use of all sources of information. By integrated use it is intended that (a) all sources of information are used simultaneously, and a decoding decision is based upon an overall likelihood score, either joint or merged, that an assemblage of characters, phonemes, movements, patterns, etc., represents a specific word; or that (b) the sources are used sequentially, but with each being used to correct any errors generated by the others. As noted above, the sources of information need not be employed by the same user, so long as both provide a consistent message. In some applications, it may be desirable to have one source provided by one user while the others are provided by another.

The following is a description of the simultaneous and sequential operation of the present invention with reference to an Automatic Handwriting Recognizer (AHR) and an Automatic Speech Recognizer (ASR) as the source models 110a and 110b, respectively. Note that only two source models are being used for brevity.

In regard to the simultaneous use of acoustic and handwriting information it is noted that both contribute to an overall decoding decision. Ambiguous characters in the handwritten information are recognized primarily on the basis of the corresponding spoken utterance and, conversely, the acoustically confusable words are recognized primarily on the basis of the handwriting information. For this technique words are uttered at the same time as they are written and, as a result, natural pauses appear in the spoken utterance. Hence, it is most advantageous to integrate isolated word speech recognition with mixed cursive and discrete handwriting recognition. If, however, the environment is too noisy for this technique it may be more appropriate to replace the traditional ASR by an automatic lip reading recognizer.

In regard to the sequential use of AHR and ASR, it is noted that AHR may be employed as an enhancement to ASR. For this approach, ASR is considered to be the primary recognition means and AHR is employed primarily as a natural and convenient interface to correct ASR errors that are displayed either on a transparent electronic tablet or on a display terminal. This technique is also suitable for entering new words, such as proper nouns, which are not in the ASR vocabulary but present in an AHR dictionary.

Alternatively, ASR may be employed as an enhancement to AHR. For this approach, AHR is considered the primary recognition means and ASR is used for the purpose of correcting AHR errors. By pointing on AHR errors in some pre-defined manner the speech transducer is activated so that the user may pronounce a correct version of the wrongly decoded handwritten word.

Referring again to FIG. 1, block 130 denotes parameters $(\theta_A, \theta_H, \ldots \theta_\star)$ that were produced from each of the source models 110 as a result of training. The training of each source parameter $\theta_i$ is done either individually, via procedures for training of each source model, or globally, using weighted sum formulae of likelihood scores with weighted coefficients $\alpha_i$ that are computed in block 150 (described below). The production of parameters generally is described in Bahl et al., "A Maximum Likelihood Approach to Continuous Speech Recognition" IEEE Transactions on Pattern Analysis and Machine Intelligence, Vol. PAMI-5, No. 2, pp. 179–180 (March 1983) which is hereby incorporated by reference in its entirety.

In particular, $\theta_i$ is a set of parameters (parameter vectors) that control a decoder (described below) for the i-th source of information. For example, if i corresponds to a speech source, then $\theta_i$ controls a specific model that is used in an automatic speech recognizer (ASR) in order to decode speech of a user. If the ASR is speaker-dependent then $\theta_i$ reflects voice characteristics of the specific person who trained the ASR.

The computed statistical parameters $\theta_i$ are used as an input into block 140. Block 140 computes scores (e.g., likelihood) $F_\theta$ for each source model. Block 150 in turn uses the computed scores and generates coefficients $\alpha_i$. $\alpha_i$ is trained on the basis of one of the three procedures described in detail below. The value of $\alpha_i$ can be returned to block 130 via line 155 to further refine the statistical parameters $\theta_i$. This loop is optional and does not have to be implemented.

Block 160 computes the weighted expression based on the computation of $\alpha_i$ and $F_i$ computed in blocks 150 and 140, respectively. Block 170 is a decoding module in which a search of the best candidate word (i.e., the word that maximizes the weighted sum) is performed.

As stated above, the automatic recognizer 100 of the present invention accepts multiple (N) sources of information. In particular, for $1 \leq i \leq N$, let $F_i(W;S_i)$ be some likelihood score attached to a particular sub-message unit W, and let $S_i$ be the observed front-end sequence from the i-th source of information. Typically, W represents a word or a string of characters from some vocabulary, and $S_i$ represents a sequence of feature vectors obtained through suitable signal processing of the raw sensor data.

For each of the N sources of information taken alone, the standard decoding procedure is to select from a list of candidate units the unit W which maximizes the score $F_i(*,S_i)$, where $F_i(\star,S_i)$ represents a function in which a different word W is substituted from the list of candidate words in the place of the $\star$ to find the word that maximizes the score $F_i(W;S_i)$. Thus, during decoding the automatic recognizer 100 considers a few possible candidate words (or character strings) from the list of alternative words. This alternative list of words is produced either from some approximate fast method (see e.g., "A Fast Approximate Acoustic Match for Large Vocabulary Speech Recognition", Proc. 1989 Eurospeech Conference, Paris (September 1989)) or from perhaps the whole vocabulary which is stored in the recognizer.

However, in the combined use of several information sources considered in accordance with the present invention, the consistent message recognition system 100 maximizes a weighted sum containing all the scores $F_i(\star,S_i)$ simultaneously.

Thus, let $\psi(W;S)$ be the overall score to maximize, then:

$$\Psi(W;S) = \sum_{i=1}^{N} \alpha_i F_i(W;S_i) \quad (1)$$

is the expression for the weighted sum of scores considered here. For normalization purposes, it will be assumed that $$\sum_{i=1}^{N} \alpha_i = 1 \quad (2)$$

Clearly, if each of the scores $F_i(\star,S_i)$ attains its maximum on the same sub-message unit, this unit is the best estimate for the piece of message jointly conveyed by all the $S_i$. The problem becomes more difficult when these scores attain their maximum on different candidate units in the vocabulary, because the final decision will depend on the weighing factors $\alpha_i$. In particular, these weighing factors should reflect, for example, the intrinsic quality of each source of information for each user, the distribution of likelihood scores over the set of candidate units, and the environment under which each $S_i$ evidence was produced.

$\alpha_i$ could be controlled manually by a user, according to his or her own intuitive estimate of the relevance of the associated source of information and the reliability of the corresponding recognition process. However, the present invention provides a number of procedures which lead to the automatic determination of explicit or approximate expressions for the weighing factors $\alpha_i$, (i=1, . . . , N).

Before proceeding, however, the main trade-offs involved in the maximization of an expression such as (1) should be examined. It seems that obtaining the weighing coefficients $\alpha_i$ is intimately related to obtaining a set of parameter vectors $\theta_i$ governing each individual score $F_i(W|S_i)$, assuming a simultaneous maximization over all $\alpha_i$ and $\theta_i$. In practice, however, such a maximization can lead to degenerative solutions for the $\alpha_i$ since the expression (1) is linear in $\alpha_i$. In addition, forming a non-linear expression in lieu of (1) is rarely feasible from a computational point of view.

In contrast, however, the present invention assumes that, for i=1, . . . , N, some parameters $\theta_i^{(0)}$ have been found by maximizing each individual score $F_{\theta i}(T_i|S_i)$ on some given training text $T_i$ (possibly common to all sources $S_i$). It then becomes possible to find some suitable coefficients $\alpha_i^{(0)}$ from (1) using algorithms to be discussed below. The next step is to compute a new set of parameters $\theta_i^{(1)}$, i= 1, . . . , N, to maximize the expression (1) given these coefficients $\alpha_i^{(0)}$. Note that usually this can be done effectively if the computation of each $\theta_i^{(0)}$ could be done effectively. For example, if each individual $F_\theta$ is a polynomial in $\theta$ with positive coefficients, the Baum-Welch technique can be used for the computation of a local maximum of $F_\theta$ (see L. E. Baum,. "An Inequality and Associated Maximization Technique in Statistical Estimation for Probabilistic functions of Markov Processes," *Inequalities*, Vol. 3, pp. 1–8, 1972). Since the weighted sum (1) will also be a polynomial with positive coefficients, the same efficient technique is applicable for the computation of the parameters $\theta_i^{(1)}$.

The above process can then be iterated until a stable set of $\alpha_i$ can be isolated. This strategy has the advantage of decoupling the estimation of the weighing coefficients from the estimation of the vector parameters for each information source. As this latter estimation depends on the type of modelling considered for each source, the present disclosure will only consider the estimation of the weighting coefficients $\alpha_i$.

Figure 2:
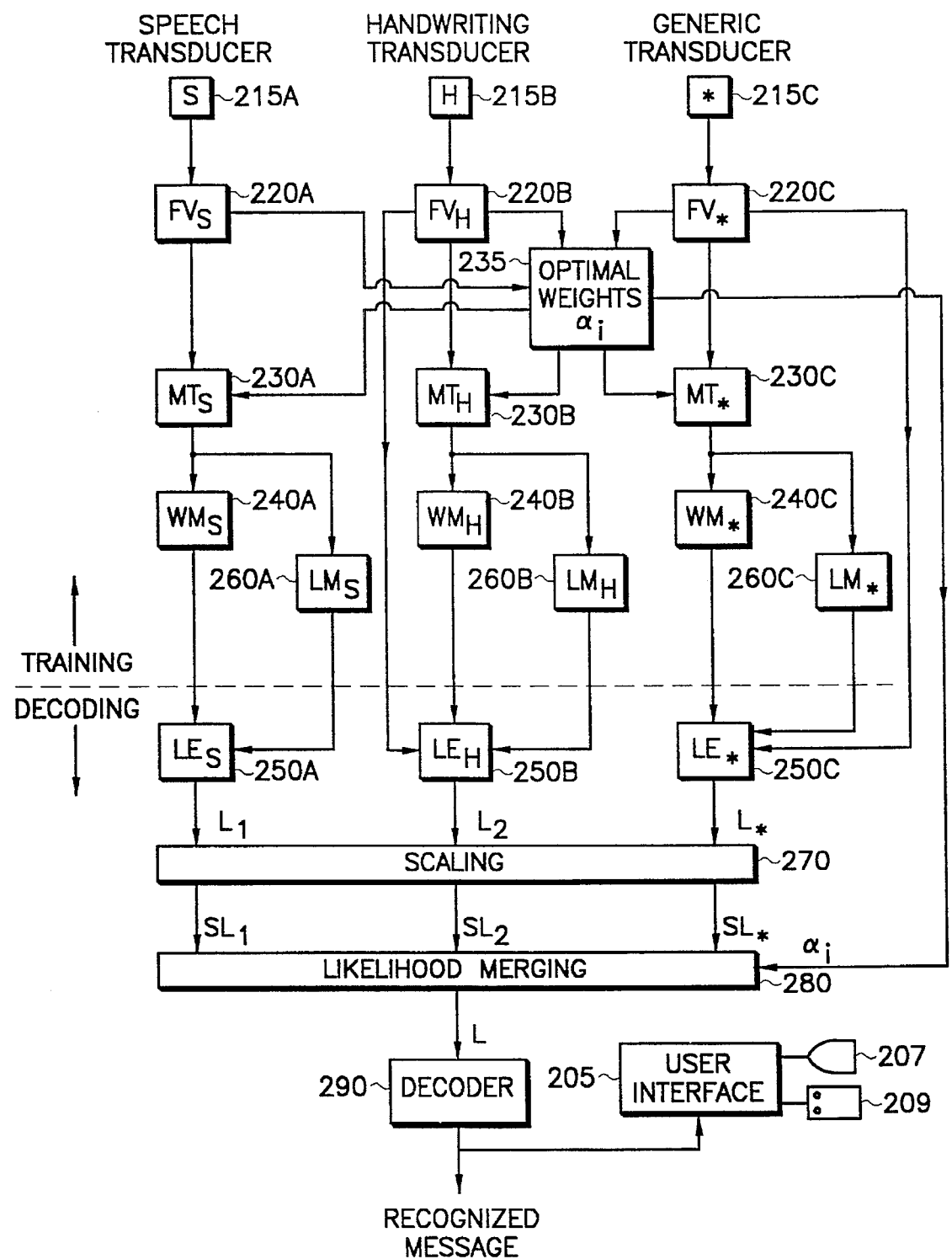
FIG. 2 is a more detailed block diagram of the message recognition system shown in FIG. 1.

Referring now to FIG. 2, a detailed illustration of the message recognizer of a preferred embodiment of the present invention is shown. The system 200 can be broken down into two different stages: training and decoding. Generally, the training stage accepts user training data and generates a weighted coefficient $\alpha$. The decoding stage accepts a consistent message from multiple sources and produces a recognized message as its output.

Next, the message recognition system 200 will be described in detail.

System 200 includes a user interface 205 coupled to a display terminal 207 for displaying information to a user of the system 200. A pointing device 209, such as a mouse and/or a keyboard, may be provided for inputting additional information to the processor 205.

In accordance with the present invention the system 200 includes a set of interfaces 215 for providing a plurality of inputs to the automatic recognition system 200. The data (information) entered into the message recognition system 200 via interfaces 215 is also referred to as raw input data. The system 200 processes the raw input data into either digital or analog transformations of the input mediums.

The multiple input user interface is comprised of, for example, a handwriting transducer 215a, typically an electronic tablet and stylus, a speech transducer 215b, typically embodied as a microphone coupled to an analog to digital converter, and a generic transducer 215c, designated with a ★ to symbolize that the message recognition system 200 contemplates being capable of receiving a variety of different sources of information.

It is noted that the handwriting transducer 215a may be embodied in any means suitable for detecting a motion of a writing implement during use by a human subject. Also, the speech transducer 215b may include any means suitable for generating a set of patterns expressive of speech. In addition, a lipreading transducer (not shown) could also be coupled to the message recognition system 200 as described in Petajan, "Automatic Lipreading to Enhance Speech Recognition" CH2145-1 pps. 40–47, IEEE (1985) Petajan discusses a solid state camera that images a subject's lips and nostrils during speech. Moreover, touch patterns, brain impulses, and/or steno information, to name a few, could also be used as an input to the message recognition system 200.

Figure 3A:
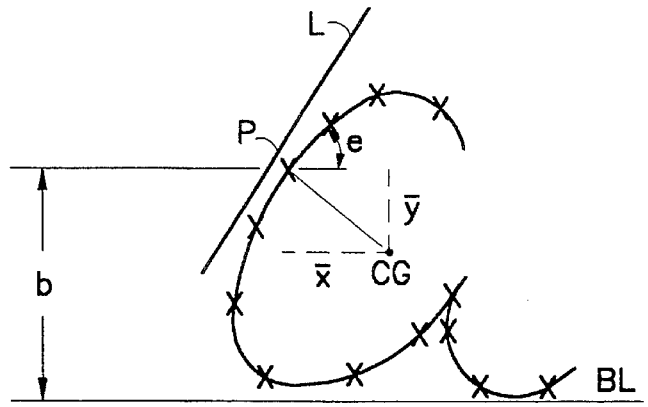
FIG. 3a illustrates a handwritten character being processed to generate a feature vector for a point (P)
Figure 3B:
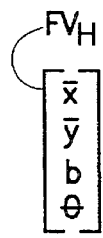
FIG. 3b illustrates a four-dimensional handwriting feature vector generated for the point (P) by collecting a plurality of spatial attributes.

With the use of a conventional electronic tablet for the handwriting transducer 215b data is typically acquired at 70 points per second. The sampled handwriting is applied to an associated handwriting feature vector ($FV_H$) processor 220a. As employed herein a feature vector is a set of characteristics of the input accumulated during a specific time interval. Processor 220b generates one or more handwriting feature vectors for each input stroke. This is preferably accomplished, as indicated in FIGS. 3a and 3b, in reference to a center of gravity (CG) of a stroke. The input stroke, by example a lower-case "a", is captured by the electronic tablet. Each feature vector includes elements expressive of an x and a y displacement of a sample point (P) on the stroke, relative to the center of gravity, a displacement (b) of P relative to a baseline (BL), and angular information (theta) relating to a line (L) tangent to P. The resulting feature vector, for this presently preferred embodiment, has four elements and thus represents a four dimensional (4-d) vector.

With the use of a microphone and A/D converter as the speech transducer 215a the speech is typically sampled at a 20 kHz rate and is Fast Fourier transformed. The amplitude (a) within 20 frequency bands is determined as ($a_1, \ldots a_{20}$) for each speech sample. The following articles are cited as teaching aspects of speech sampling and transformation that are suitable for use by the system 200: J. R. Cohen, "Application of an Auditory Model to Speech Recognition" J. Acoustic Soc. of America, Vol 85, No. 6, pp. 2623–2629 (June 1989); A. Nadas, D. Nahamoo, and M. A. Picheny, "Speech Recognition Using Noise-Adaptive Prototypes" IEEE Trans Acoustics, Speech, Signal Processing, Vol. 37 No. 10, pp. 1495–1503 (October 1989); and "Adaptive Labelling: Normalization of Speech by Adaptive Transformations Based on Vector Quantization" in Proc. 1988 Int. conf. on Acoustics, Speech, Signal Processing, New York, N.Y. pp. 40–43 (April 1988).

Figure 3C:
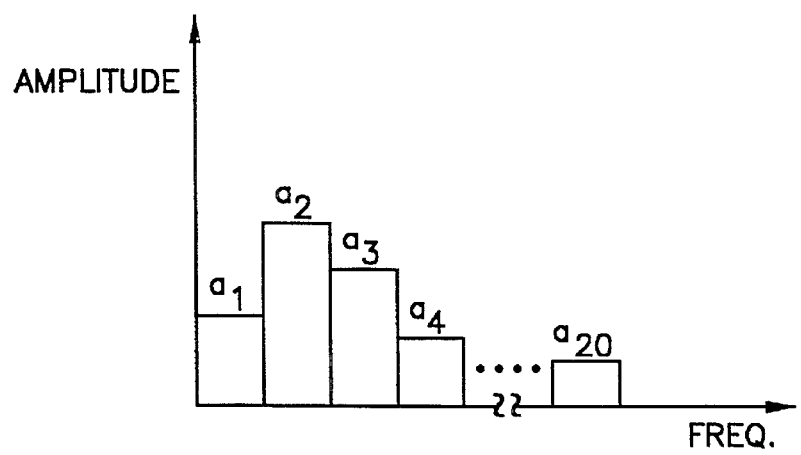
FIG. 3c illustrates, in the frequency domain, a speech sample being processed to obtain a feature vector therefrom, specifically, the determination of amplitudes associated with a plurality of frequency bands, not necessarily all of equal bandwidth.

FIG. 3c illustrates a speech sample being processed to obtain a speech feature vector ($FV_S$) therefrom. The determination of amplitudes associated with the plurality of frequency bands yields a twenty dimensional (20-d) frequency domain feature vector. The output of the speech transducer 215a is applied to an associated $FV_S$ processor 220a that generates the series of 20-d speech feature vectors, wherein each element of the vector is expressive of an amplitude within one of the 20 sampling bands.

Once again, it is contemplated that other samples will be processed to obtain other feature vectors therefrom. Those skilled in the art would be in a position to generate the required feature vectors from other samples not discussed above.

During training of the system 200 the feature vectors are each applied to an associated word model training processor. Specifically, the speech vectors are applied to a speech model trainer ($MT_S$) processor 230a, the handwriting feature vectors are applied to a handwriting model trainer ($MT_H$) processor 230b, and the ★ feature vectors are applied to a ★ model trainer ($MT_★$). Each of the model trainer processors may be coupled (not shown) to the user interface 205 for interacting with a user during training. This interaction may involve the entry of training sets of sentences by the user and the display of training results.

Each model trainer processor functions to determine a set of optimal parameters for an associated model, specifically a speech word model ($WM_S$) 240a, a handwriting word model ($WM_H$) 240b, and a ★ word model ($WM_★$) 240c. In addition, a function of each of the training processors 230a and 230b is to determine optimal weights as shown in block 235. The optimal weights are represented as $\alpha_i$ ($i=1, 2, \ldots, N$). $\alpha_i$ governs the relative contribution of speech, handwriting, and ★ to the final message recognition. For example, if during training on a specific set of training data speech is found to provide a higher likelihood, or score, than handwriting, the weight associated with the speech likelihood is increased and the weight associated with the handwriting likelihood is decreased. If the two likelihood scores are found to be comparable the weights are set to be the same.

In a presently preferred embodiment of the invention the speech trainer 230a operates in accordance with a hidden Markov model technique to identify phonemes and individual words. By example, for English speech there are four general classes of phonemes: nasals, stops, vowels and fricatives. The training and use of Markov models for speech recognition is disclosed in a journal article entitled "A Maximum Likelihood Approach to Continuous Speech Recognition", IEEE Transactions on Pattern Analysis and Machine Intelligence, Vol. PAMI-5, No. 2, March 1983 pp. 179–190 by L. Bahl et al. The technique described in this article is one suitable technique for implementing the speech language model 260 (discussed below) and model trainer 230. In general, a hidden Markov model or source is comprised of a collection of states connected to one another by transitions which produce symbols from a finite alphabet. For training, one state is chosen as an initial state and another state is chosen as a final state. A training algorithm assigns probabilities to all strings of transitions from the initial state to the final state, as well as all outputs generated in the process.

The role of the Markov word model for speech is to represent the pronunciation of a word. The parameters of the Markov model are trained by relating the acoustic signal produced by the speaker to the word uttered. There is one Markov word model per word in the vocabulary.

The handwriting model trainer 230b preferably operates in accordance with an elastic stroke matching technique disclosed by C. C. Tappert in an article entitled "Adaptive On-Line Handwriting Recognition", IEEE International Conference on Pattern Recognition Proceedings (1984). As employed herein elastic matching clusters elastically deformed input strokes, as represented by their associated stroke vectors, into stroke templates to form character prototypes.

Coupled to the output of each of the models 240 is a Likelihood Estimator (LE), specifically, a speech LE 250a handwriting LE 250b, and ★ LE 250c. The general purpose of each of the LEs, in conjunction with their associated word models 240, is to assign probabilities to strings of words in response to input speech or handwriting signals. Each LE can be aided by a Language Model (LM), specifically a speech LM 260c, a handwriting LM 260c and ★ LM 260c, whose role is to reduce the search space by a priori discarding unlikely strings of words or characters. The LM is an optional feature of the present invention and does not have to be implemented to make the present invention operational.

After training, and during decoding of, for example, on-line speech and/or handwriting, the LEs 250 receive the feature vectors from blocks 220, and, in conjunction with the associated word models, and in some cases the associated LM scores, generate estimations of probable matching words. For example, the speech estimator 250a outputs a list ($L_1$) of word estimations and the handwriting estimator 250b also outputs a list ($L_2$) of word estimations.

The output of the Likelihood Merging (LM) block 280 is a list (L) of possible words corresponding to the acoustic, stroke, and/or ★ inputs. The list of words is ordered by probability. In general, the members of the list L are a function of $SL_1$, $SL_2$, and $SL_★$ and the associated weights $\alpha_i$. The list of possible words is applied to a decoder 290 that selects the candidate word having the highest probability. This selected candidate word is considered to be a recognized message and becomes available to use by other applications including the user interface 205. These other applications may include, for example, a word processing or spreadsheet program.

It is within the scope of the invention to provide automatic pruning or trimming of the scaled lists $SL_1$, $SL_2$, and $SL_★$ such that L contains only those candidate words that are common to both $SL_1$, $SL_2$, and $SL_★$. This method of trimming is readily accomplished by inspection. An initial trimming of the two word lists simplifies the task of decoder 290 in that fewer candidate words need be considered for likelihood merging. Similar to the LM scores, this is only an option and does not have to be implemented.

Figure 5:
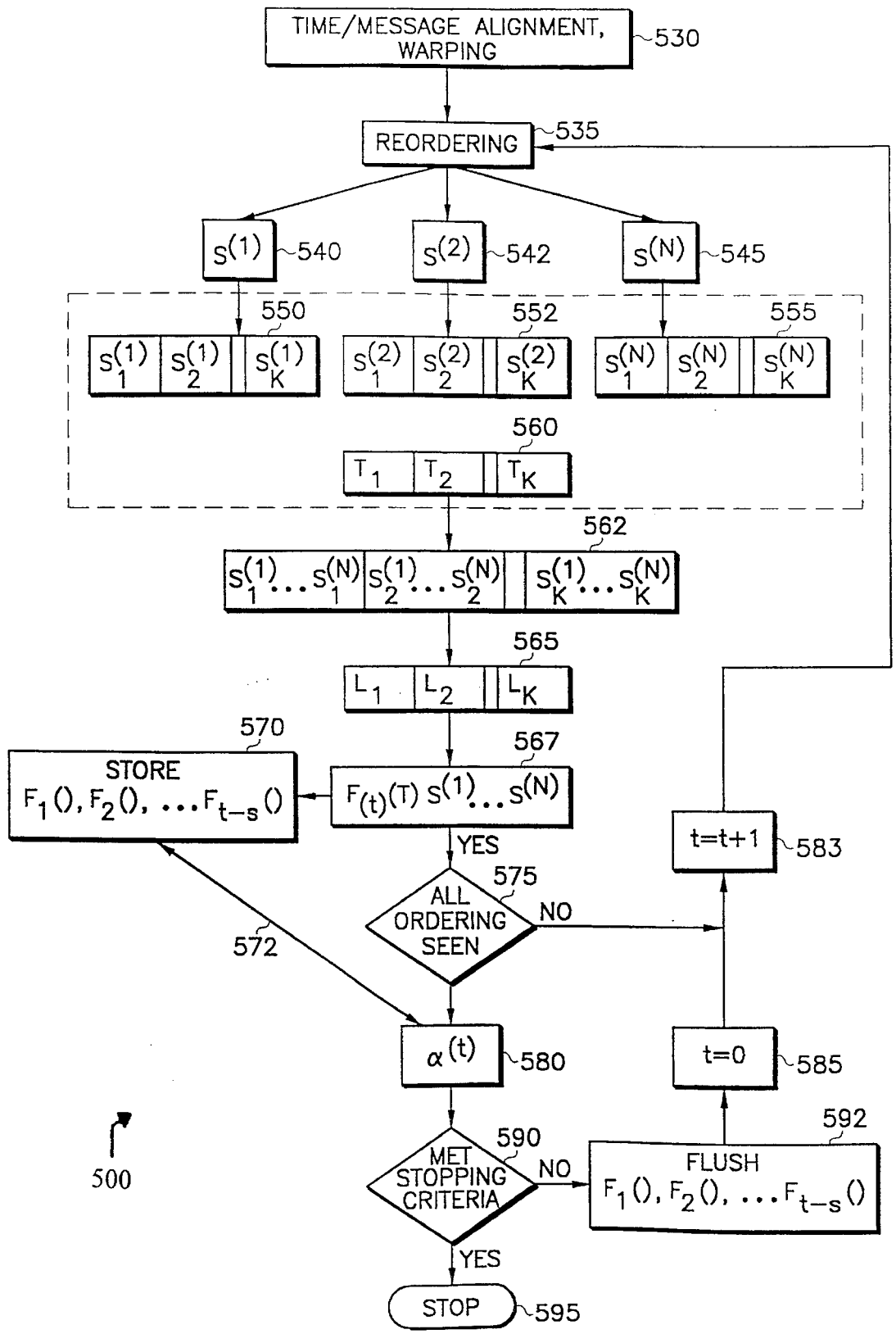
FIG. 5 is a flowchart of the procedure for generating weighted coefficient $\alpha$.

FIG. 5 illustrates a flowchart corresponding to a training procedure 500 for $\alpha_i$. Procedure 500 represents block 150 and 235 described generally above in connection with FIG. 1 and FIG. 2, respectively.

Generally, the coefficients $\alpha_i$ are used to assign a weight to each source of information. $\alpha_i$ tends be higher for those scores function $F_i(★, S_i)$ that frequently provide a consistently correct decoding of the consistent message. For example, in noisy situations handwriting can be a more reliable source of information than speech and therefore $\alpha_i$ corresponding to the score function for handwriting recognition should be given a higher weight than if the speech sample was produced in quiet conditions. However, in the same noisy condition if the handwriting sample was produced by a writer whose hands shake (from, for example, a disease) then even in the noisy situation, the speech sample might now be more relevant than the handwriting sample and $\alpha_i$ would be modified accordingly.

Similar considerations appear if a lipreading sample is entered into the system 200. Light conditions (dark v. bright) could affect the value of $\alpha_i$ that corresponds to lipreading source of information.

Referring in detail to FIG. 5, Block 530 provides a warping of the multiple messages. Input data from blocks 220a, 220b, 220c is aligned against each other in accordance with their time production, as well as other general characteristics. Specifically, the multiple inputs forming the consistent message are initially converted into feature vectors $S_i$. The warping is done based on alignment of the feature vector sequence with the text of the message. A procedure called Viterbi alignment can be used, for example. Among other places, this algorithm is discussed in F. Jelinek, "The Development of an Experimental Discrete Dictation Recognizer" Proc IEEE, Vol 73, No 11, pp. 1616–1624, November 1985. Once the alignment between the text and the evidence corresponding to each source of information is produced, the overall alignment between all evidence can be deduced.

An example of the warping procedure is shown in FIG. 4a through 4c. For illustrative purposes only two sources of information are used: a spoken message and a written message. $S_1$ represents the feature vector generated from the spoken source information and $S_2$ represents the feature vector generated from the written source information. Both feature vectors are broken into units from 1 to $\sigma$. Next, both feature vectors are aligned with respect to each other, thus creating a direct correlation between the units in the set of speech source information and the set of written source information.

Next, procedure 500 reorders the vectors $S_i$ based on the results of warping step 530, as shown in block 535. The sources of information (speech, handwriting, etc.) are ordered by some predefined criteria. For example, the information can be ordered based on the quality of a given source or by the level of its eventual contribution to the overall decoding. The information can also be ordered randomly.

As mentioned earlier, each $\alpha_i$ should vary in accordance with the degree of confidence that can be placed in the associated source of information and corresponding recognition process. This implies that they should reflect the effects of ambient noises, user-dependent characteristics such as age and sex, and recording equipment quality. Assuming, as in all statistical approaches, that the experimental conditions observed during training will also be encountered during decoding, such effects can be captured while enrolling each user.

Take for example the situation when a handwriting sample, speech sample, and lipreading sample are entered into the message recognition system 100 in relation to a consistent message T, and the quality of the three inputs from best to worst is speech, handwriting, and lipreading. In operation, reordering block 535 would order the three samples as: $S^{(1)}$ corresponding to the speech sample; $S^{(2)}$ corresponding to the handwriting sample; and $S^{(3)}$ corresponding to the lipreading sample.

Blocks 540, 542, 545 label the multiple sources of reordered information. The N sources of reordered information are labeled $S^{(1)}$, $S^{(2)}$, $S^{(N)}$, where the numbers that mark each source are referred to as ordered numbers. Next, each i-th source of labeled information is partitioned into K subunits: $S_1^{(i)}, S_2^{(i)}, \ldots, S_k^{(i)}$ (i=1, 2, ..., N), as indicated in blocks 550, 552, and 555. These subunits of information correspond to pieces of messages $T_1, T_2, \ldots T_K$; r-th subunit $S_r^{(i)}$ corresponds to $T_r$ (r=1, 2, ..., K).

In block 560, subunits from different sources of information with the same ordering number are aligned against each other in accordance with the results obtained in block 530. The alignment for each pair of subunits is induced by global alignment of all whole pieces of different sources of information in block 530.

Subunits of different sources of information corresponding to the same piece of a message are then grouped together in block 562 (regrouping block 562). This regrouping gives K groups of aligned subunits in each group of N aligned subunits.

As shown in block 565, each group of units $S_i^{(1)}, S_i^{(2)}, \ldots, S_i^{(N)}$ (i=1, 2, ..., K) from the regrouping block 562 gives rise to a likelihood score $L_i$ (also referred to herein as a unit score). Specifically, each i-th group of pieces of source evidence $S_i^{(1)}, S_i^{(2)}, \ldots, S_i^{(N)}$ gives rise to computation of likelihood score:

$$L_i = L(T_i | S_i^{(1)}, S_i^{(2)}, \ldots, S_i^{(N)}).$$

This computation can be performed using standard methods (e.g., Viterbi and forward-backward algorithms). For example, one can divide a text $T_i$ in subunits $U_1, U_2, \ldots, U_r$ and produce strings of labels for each piece of information evidence: $f_1^{(1)} \ldots f_d^{(1)}; f_1^{(2)} \ldots f_e^{(2)}; \ldots f_1^{(N)}$. L is computed approximately as: $L(U_1, U_2, \ldots, U_r | f_1^{(1)} \ldots f_d^{(1)}; f_1^{(2)} \ldots f_e^{(2)}; \ldots f_1^{(N)}) \to L(U_1, U_2, \ldots, U_r \mathcal{L}_1^{(1)} \ldots \mathcal{L}_d^{(1)}; \mathcal{L}_d^{(2)} \ldots \mathcal{L}_e^{(2)}; \ldots \mathcal{L}_f^{(N)})$.

The likelihood scores from block 565 produce a global score $F_{(o)t\ ans}^{(1)} \ldots S^{(N)})$, as indicated in block 567. The global score can be approximately computed as a product of $L_1, L_2, \ldots, L_k$ (as generated in block 565). However, in general more complex approximations can be considered.

The computation described in block 567 is stored, as indicated in block 570. Block 575 checks a list of orderings (that was previously prepared) to determine whether all the orderings have been seen. If they have not, then t is increased by one (block 585) and the computation of $\alpha$ is returned to block 535 for reordering. Otherwise, the procedure 500 proceeds to block 580.

The weighted coefficients $\alpha^{(t)}$ are computed using the scores $F_1(\bigstar), F_2(\bigstar), \ldots, F_N(\bigstar)$ that are stored in block 570. After initial values for weighted coefficients are given and scores from block 567 are generated, gamma is computed as in equation (3) above and the derivatives are computed for each i, where i=1, 2, . . . , N. After all derivatives are computed the weighted coefficients are computed. The number of loops for computation of e depends on a maximal number M or some other predetermined criteria.

Finally, if the number of iterations exceed some predetermined number N_max or some equivalent criteria is met (e.g., $\alpha$ has not changed significantly with each new computation), then training of the weighted coefficients $\alpha$ is completed. Otherwise, the computation is returned to the reordering block 535. Before the procedure returns to block 535, however, the stored global scores are flushed, as shown in block 592, and t is set to zero.

By allowing the procedure to returned to reordering block 535, the source information can be reordered in block 535 and/or regrouped in block 562, thus providing a new set of data to calculate $\alpha$.

The following procedures estimate $\alpha_i$ as part of the training procedure, using data collected for training. The present invention provides three main classes of training procedures: (1) Deleted Interpolation, (2) Expectation-Maximization, and (3) Joint Maximum Likelihood. Only one of these procedures is used at any given time. Which procedure is used depends on a trade-off based on cost-performance. The operation of these procedures will be next described in detail below.

(A) Deleted Interpolation

Let the training text T be split into K disjoint pieces $T_1, T_2, \ldots, T_K$, each representing a training subtext. Assuming independence, computing $\psi$, where $\psi$ stands for the overall score to maximize in (1), over the training text T is equivalent to computing the following expression:

$$\Psi(\alpha_1, \ldots, \alpha_N) = \prod_{k=1}^{K} \left[ \sum_{i=1}^{N} \alpha_i F_i(T_k; S_{i,k}) \right] \quad (3)$$

where $S_{i,k}$ represent the evidence gathered through the i-th source of information using the subtext $T_k$. Thus, from (1), the optimal values of $\alpha_i$ are those which maximize $\psi(\alpha_i, \ldots, \alpha_N)$.

Note that this expression is non-linear in $\alpha_i$, thus getting around the degenerescence problem mentioned earlier. Using a well-known forward-backward algorithm (see L. E. Baum, "An Inequality and Associated Maximization Technique in Statistical Estimation for Probabilistic Functions of Markov Processes," *Inequalities*, Vol. 3, pp. 1–8 (1972), which is hereby incorporated by reference in its entirety), a local maximum of this expression can be found by starting from an initial guess $\alpha_i^{(0)}$ (e.g., 1/N) and following the iterative procedure below, where $r \geq 0$.

$$\alpha_i^{(r+1)} = \frac{D_i}{\sum_{i=1}^{N} D_i} \quad (4)$$

where $$D_i = \alpha_i^{(r)} \frac{d\Psi(\alpha_1^{(r)}, \ldots, \alpha_N^{(r)})}{d\alpha_i^{(r)}} \quad (5)$$

Note that, providing a good starting point is selected, This procedure effectively converges to the global maximum.

Figure 6:
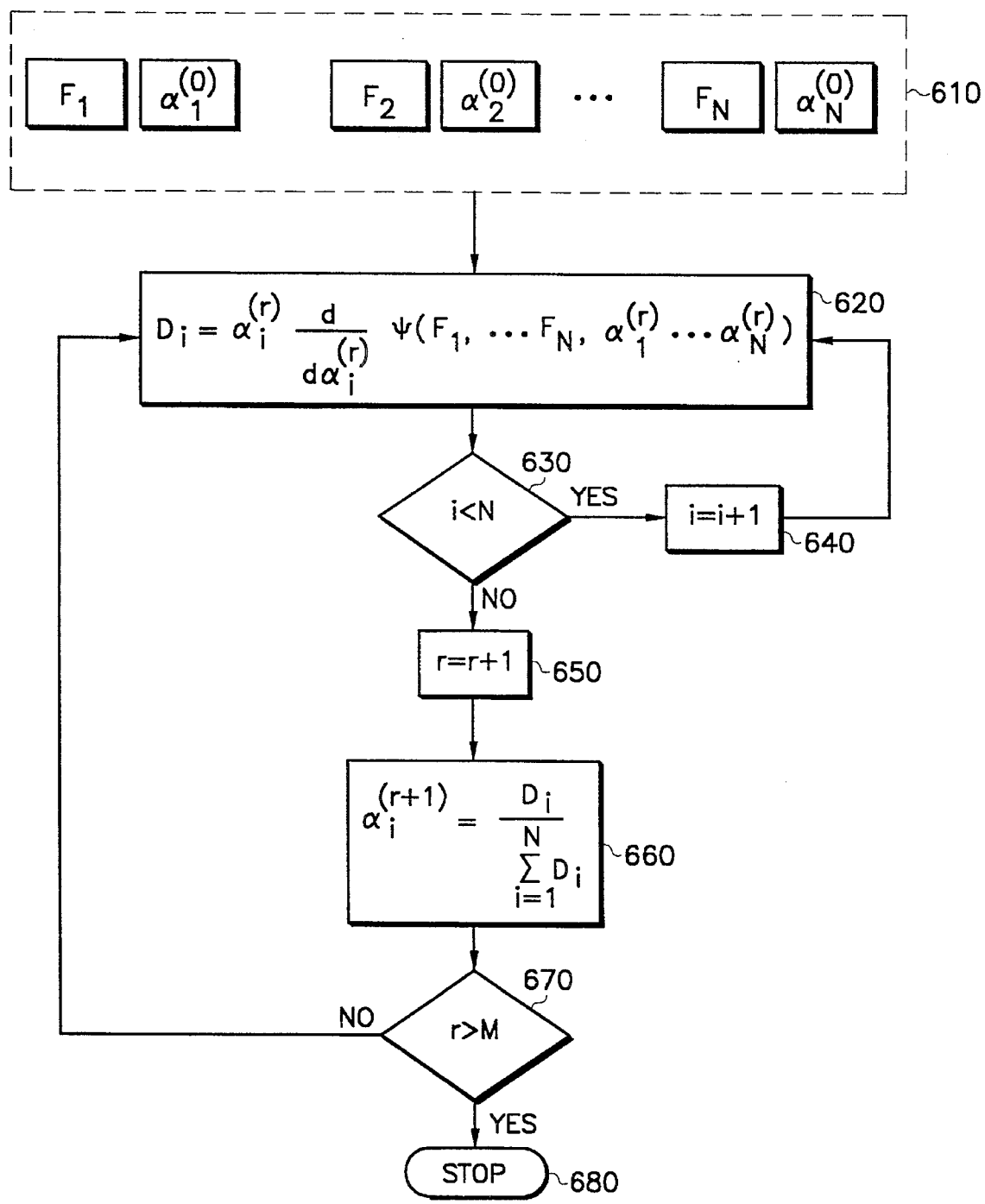
FIG. 6 is a flowchart of the deleted interpolation procedure for generating $\alpha$.

The deleted interpolation procedure is shown in FIG. 6. Initially, as shown in block 610, $\alpha$ is initialized (either randomly or from heuristics); upper index (0) means initialization, and sub indexes 1, 2, . . . N account for the sources of information (N sources). In addition, score functions $F_1, F_2, F_3, \ldots F_N$ are also generated in block 610; each score function measures the likelihood of the corresponding source of information to have some textual data ($T_k$) coupled with given pieces of source data ($S_{i,k}$). Numbers i=1, 2, . . . N index the sources of information and k=1, 2, . . . K index different textual data that were used in training. Scores $F_1, F_2, \ldots F_N$ remain fixed in this procedure whereas $\alpha_1, \alpha_2, \ldots \alpha_N$ are changing iteratively.

Next, the computation of weight factors $D_i$ (i=1, 2, . . . N) is done, as shown in block 620. Weight factors $D_i$ represent quantitative information measuring the contribution of previously computed coefficients $\alpha_i$ and score functions $F_i$. These weight factors depend on the speed with which the total score function in (3) grows at their projection on the i-th coordinate of $\alpha_i$ (the higher this speed the larger the value of $D_i$), as well as the current value of $\alpha_i$ (the larger $\alpha_i$ the larger $D_i$).

Block 630 checks to determine if all sources of information have been used to compute the weight factors $D_i$. If it hasn't then the procedure increments i and loops back to block 620. If all sources have been considered then the process flows to block 650.

Block 650 increments the iteration index r. Block 660 performs the next iterative step for computing $\alpha_i$. The iterative values for $\alpha_i^{(r)}$ corresponding to the iterative step r are computed as normalization of weight factors $D_i$ (i=1, 2, . . . N). This procedure continues either until iterative values of $\alpha_i$ stabilize or a predetermined threshold value M, shown in block 670, is exceeded.

(B) Expectation-Maximization

More generally, a version of the general Expectation-Maximization (EM) procedure which is appropriate for mixtures such as defined in (1) can be used. This procedure is described in greater detail in R. A. Redner and H. F. Walker, "Mixture Densities, Maximum Likelihood and the EM Algorithm," Siam Review, Vol. 26, No. 2 April 1984, which is hereby incorporated by reference in its entirety herein. With the same definitions as above, the recursive procedure is as follows: (a) Choose some initial $\alpha_i^{(0)}$; for example, set them all equal to 1/N and (b) compute for k= 1,2, . . . , K:

$$P^{(r+1)}(S_{i,k}|T_k) = \frac{\alpha_i^{(r)} P^{(r)}(T_k|S_{i,k})}{\sum_{i=1}^{N} \alpha_i^{(r)} P^{(r)}(T_k|S_{i,k})} \quad (6)$$

Then update the weighing factors as:

$$\alpha_i^{(r+1)} = \frac{1}{K} \sum_{k=1}^{K} P^{(r+1)}(S_{i,k}|T_k) \quad (7)$$

where r≧b 0. Again, the convergence of this procedure, while guaranteed, depends on the initial conditions selected for $\alpha_i$.

Figure 7:
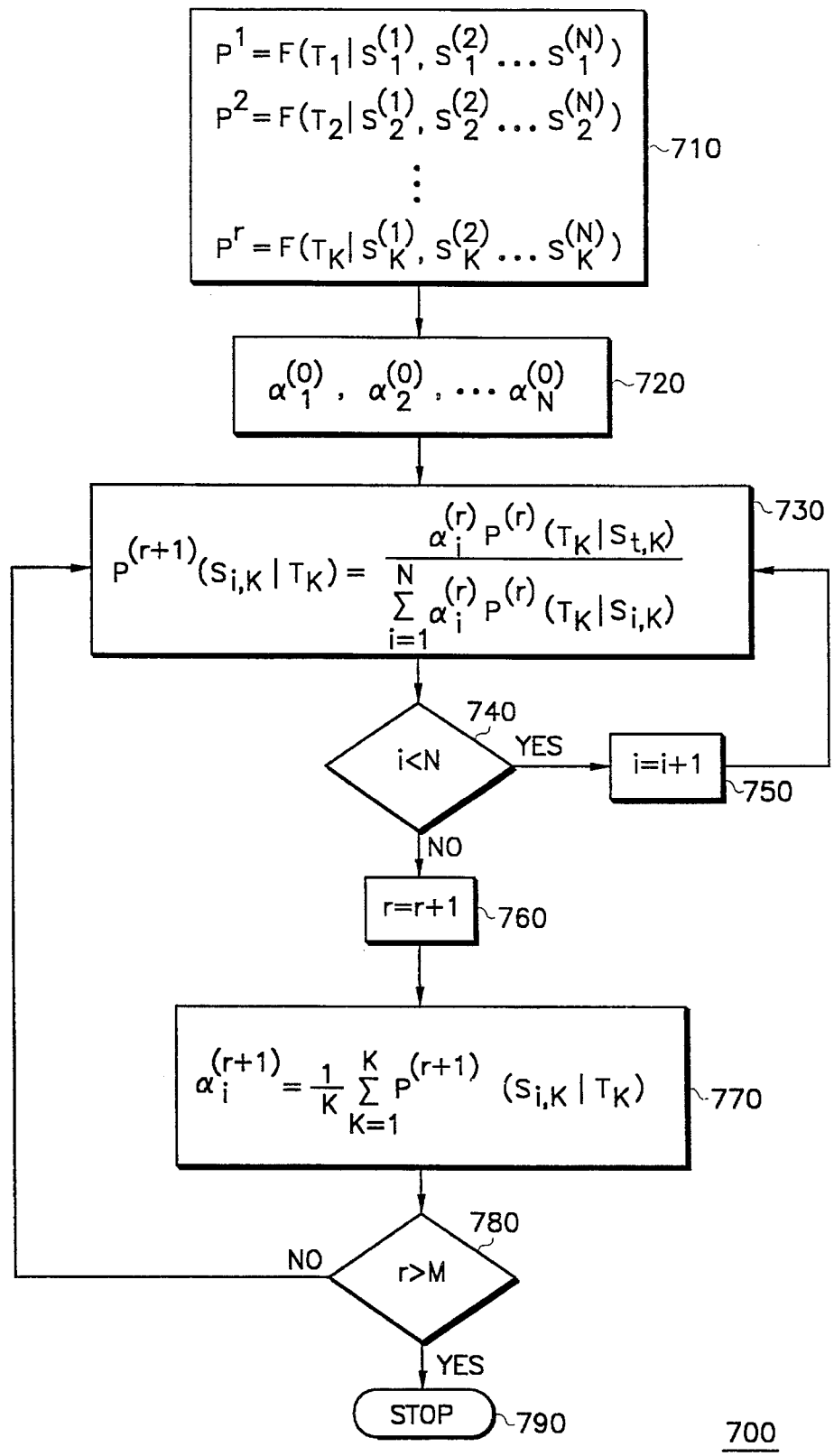
FIG. 7 is a flowchart of the expectation-maximization procedure for generating $\alpha$.

The expectation-maximization procedure is shown in FIG. 7. Initially, as shown in block 710, the values for P (probability) in equation (6) are initialized, and in block 720, α is initialized.

Block 730 provides an iterative expectation computation of score $p^{(r)}$ based on the probability scores that were estimated in previous iterations. Block 740 checks to determine whether all probabilities of scores (one for each source of information) have been computed. If they have not, then i is incremented and block 730 is repeated. Otherwise procedure 700 proceeds to block 760.

Block 760 increments the iteration index r. Block 770 performs the iterative computation of α. α is computed as the average of the probability scores P that were computed in block 730.

Finally, block 780 checks to determine whether the number of iterations has exceeded a predetermined threshold.

(C) Joint Maximum Likelihood

Alternatively, we can arrive at a different procedure by starting from the expression for the joint likelihood. Note first that if only one source of information were present, say $S_i$, then the task of a maximum a posteriori decoder would be to find the string of sub-message units W which maximizes $P(W|S_i)$. Using Bayes' rule and the fact that the maximization is performed on W, not $S_i$, this operation can be written:

$$\max_W P(W|S_i) = \max_W P(S_i|W)P(W) \quad (8)$$

Thus, generally speaking, $F_i(W;S_i)=P(S_i|W) P(W)$.

When all the sequences $S_i$ corresponding to the N sources of information are available, the task of the maximum a posteriori decoder is to find the string of sub-message units W which maximizes $P(W|S_i, \ldots S_N)$. Using Bayes' rule and the chain rule, together with the fact that the maximization is performed on W, not on any of the $S_i$, it can be written:

$$\max_W P(W|S_1, \ldots, S_N) = \max_W \left[ \prod_{j=2}^{n} p(s_j|S_1, \ldots, s_{j-1}, w) \right] P(S_1|W)P(W) \quad (9)$$

This expression has been obtained through the chain rule starting from $S_N$ and proceeding to $S_1$. Among many other possibilities, N-1 additional ways can be selected to expand (9), starting from $S_{N-1}$, $S_{N-2}$, and so on in a round robin fashion. Putting all of these expressions together, the following expression is generated:

$$\max_W P(W|S_1, \ldots, S_N) = \max_W \frac{1}{N} \sum_{i=1}^{N} \quad (10)$$

$$\left[ \prod_{j=1}^{i-1} P(S_j|S_{max(0,min(1,i-2))}, \ldots S_{max(0,i-2)}, S_i, \ldots, S_N, W) \right]$$

$$\left[ \prod_{j=i+1}^{N} P(S_j|S_i, \ldots, s_k-1, W) \right] P(S_i|W)P(W)$$

where by convention $S_O$ is null. Relating this to (1), it becomes clear that the weighing factors $\alpha_i$ can be expressed in the following symmetric fashion:

$$\alpha_i = \frac{1}{N} \left[ \prod_{j=1}^{i-1} P(S_j|S_{max(0,min(1,i-2))}, \ldots, S_{max(0,i-2)}, S_i, \ldots, S_N, W) \right] \quad (11)$$

$$\left[ \prod_{j=i+1}^{N} P(S_j|S_i, \ldots, S_{j-1}, W) \right]$$

for any 1≦i≦N. Furthermore, this is an exact expression for each $\alpha_i$.

Each multiplicative term in (11), such as $P(S_j|S_i, \ldots, S_{j-1}, W)$, for example, can be understood as follows. In an ideal situation, assuming that a sufficient amount of training data is available, the quantity $P(S_j|S_i, \ldots, S_{j-i}, W)$ is obtained by training the model corresponding to the j-th source of information for all possible front-end sequences $S_j$, when these sequences are observed at the same time as fixed front-end sequences produced by the other sources of information $S_i, \ldots S_{j-1}$, using some common training text W. In practice, however, it is doubtful that a sufficient amount of training data could ever be collected for every source under every possible condition appearing in (11).

One possibility is to reduce the size of the sub-message unit to be recognized, so as to limit the number of potential front-end sequences that can be observed. Another way of achieving the same result would be to constrain the size of the front-end label alphabet by introducing equivalence classes on this alphabet. Alternatively, one may introduce some approximation in (11) so as to alleviate the heavy conditioning. For example, the model corresponding to the i-th source of information may be trained in the presence of only one (the most relevant) additional source of information. Assuming a judicious indexing of the sources of information, this leads to:

$$\alpha_i = \frac{1}{N} \prod_{j=2}^{N+1} P(S_{J-1}|W) \quad (12)$$

whereby convention $S_{N+1}=S_1$. This expression is much easier to implement than (11), at the expense of some loss of optimality in the derivation of the αi.

There are numerous applications which could benefit from integrating multiple sources of information using the above three procedures. They can be roughly classified into three distinct categories: (1) Multiple Measurements, (2) Multiple Models, and (3) Divide and Conquer Methods.

The multiple measurement category includes speech and handwriting recognition, as described in U.S. patent application Ser. No. 07/676,601. now abandoned (cited above), as well as various enhancements thereof. For example, various syntactic features (nouns, verbs, etc.) of the language could be easily interpreted as multiple sources of information; lipreading information could be useful for improving the recognition of speech in noise; and hand movement information could perhaps make handwriting recognition more robust.

Ultimately, electrical impulses could be measured directly from the brain to reduce the amount of distortion introduced by the various transducers involved. Until such sensors can be made unintrusive enough, however, multiple solutions are expected to be especially useful to provide disabled people with more reliable means of communication.

The multiple model category assumes that for the same source of information several modelling strategies are available to carry out the message recognition. Examples include using both discrete and continuous parameter hidden Markov models to represent one set of acoustic data, as well as using both elastic matching and hidden Markov modelling to recognize a sequence of handwritten characters.

This means that we can compute several scores $L_i(W|S_i)$ for the same source information S. But this problem can be cast in the form of (1) by just letting $L_i(W|S)=F_i(W|S_i)$ where $S_i=S$. This allows one to interpret the multiple use of the same data as multiple sources of information.

The divide and conquer method category is especially relevant to the construction of good statistical language models for use in various recognition and translation tasks. The standard approach is to derive, for any given sequence of words $W_1 \ldots W_M$, the n-gram probabilities $P_{(Wi-1, \ldots Wi-n+1)}$, i=1, . . . . , M. These probabilities are used for predicting the current word knowing the n-1 previous words. The main difficulty is that finding n-gram probabilities for n>3 requires too enormous a set of training texts to be practical.

In such a case, one could conceivably replace the estimation of the n-gram probabilities $P_{(Wi-1, \ldots Wi-n+1)}$ by estimation of the following (N=n-2)-term weighted sum:

$$\sum_{j=1-m+3}^{i} \alpha_j P(W_j|W_{j-1},W_{j-2}) \quad (6)$$

In which each term $P(W_j|W_{j-1},W_{j-2})$, a 3-gram probability, is easy to calculate. It is clear that each of these terms can be interpreted as a separate source of information, and we can therefore set $F_j(W_j;S_j)=P(W_j|W_{j-1},W_{j-2})$ where $S_j=W_{j-1},W_{j-2}$. Thus, the procedures described previously can also be used for estimating the $\alpha_j$ coefficients in (13).

While the invention has been particularly shown and described with reference to preferred embodiments thereof, it will be understood by those skilled in the art that various changes in form and details may be made therein without departing from the spirit and scope of the invention.

Having thus described our invention, what we claim as new and desire to secure by Letters Patent is:

1. In a message recognition system, a method of transforming a consistent message into a message recognizable by the computer, the method comprising the steps of:

(A) transforming the consistent message generated by a human in at least two formats into electrical signal representations of the consistent message;

(B) producing from said electrical signal representations of the consistent message a set of parameters for each said format;

(C) generating a likelihood score of recognition for each said set of parameters;

(D) using said sets of parameters to train a weighting coefficient for each of the at least two formats of the consistent message, wherein said step of training a weighting coefficient comprises the steps of (i) partitioning the consistent message in each said format into one or more subunits, wherein each subunit corresponds to a piece of the consistent message, (ii) grouping said subunits from each said format into a plurality of groups, wherein each group comprises one said subunit from each said format, and wherein each said subunit in one said group corresponds to the same piece of the consistent message, (iii) determining a likelihood score of recognition for each said group of subunits, (iv) determining a global score for the consistent message based on said likelihood scores of recognition, and (v) using said global score to determine said weighting coefficients, (E) generating a weighted expression based on said trained weighting coefficient and said likelihood scores of recognition; and (F) selecting a candidate message unit that maximizes said weighted expression to transform said electrical signal representations of the consistent message into a computer recognizable message.

2. The method of claim 1, wherein said trained weighting coefficients are used to produce a new set of parameters and said new set of parameters is applied to generate new said trained weighting coefficients.

3. The method of claim 2, wherein said step of producing a new set of parameters from said trained weighting coefficients is repeated until a stable set of trained weighting coefficients is isolated.

4. The method of claim 1, wherein the consistent message is transformed into said electrical signal representations using a transducer.

5. The method of claim 4, wherein said formats of the consistent message are transformed into said electrical signal representations simultaneously.

6. The method of claim 4, wherein said formats of the consistent message are transformed into said electrical signal representations sequentially.

7. The method of claim 1, wherein said trained weighting coefficients are determined in said step (v) using a deleted interpolation procedure.

8. The method of claim 7, wherein said deleted interpolation procedure comprises the steps of:

(a) initializing said trained weighting coefficients;

(b) generating at least two weight factors, whereby said weight factors represent quantitative information measuring the contribution of previously generated weighting coefficients;

(c) repeating steps (a) and (b) for all formats of the consistent message; and (d) generating said trained weighting coefficients based on a normalization of said at least two weight factors.

9. The method of claim 8, wherein steps (b) through (d) are repeated until iterative values of said trained weighting coefficients stabilize or until a predetermined threshold is met.

10. The method of claim 1, wherein said trained weighting coefficients are determined in said step (v) using an expectation-maximization procedure.

11. The method of claim 10, wherein said expectation-maximization procedure comprises the steps of:

(a) initializing a set of expectation probability scores and said trained weighting coefficients;

(b) iteratively generating an expectation probability score based on previously generated expectation probability scores;

(c) repeating steps (a) and (b) for all formats of the consistent message;

(d) iteratively generating said trained weighting coefficients as the average of said expectation probability scores; and (e) repeating steps (b) through (d) until a predetermined threshold is met.

12. The method of claim 1, wherein said trained weighting coefficients are determined in said step (y) using a joint maximum likelihood procedure.

13. The method of claim 12, wherein said joint maximum likelihood procedure comprises the steps of:

(a) producing at least two sets of feature measurements from said at least two formats and organizing said set of measurements into at least two sets of feature vectors;

(b) providing a warping of said representations of the consistent message;

(c) ordering said set of feature vectors based on predefined criteria to form an ordered set of feature vectors;

(d) partitioning said ordered set of feature vectors to form a partitioned set of feature vectors;

(e) aligning said partitioned set of feature vectors in accordance with said warping step to form an aligned set of feature vectors;

(f) grouping said aligned set of feature vectors to form grouped set of feature vectors, wherein each group of units from said grouped set of feature vectors gives rise to a likelihood score;

(g) producing a global score from said set of likelihood scores; and (h) generating said trained weighting coefficients from said global score.

14. The method of claim 13, wherein said produced global score is saved and steps (c) through (f) are repeated by reordering said set of feature vectors; and wherein said weighting coefficients are generated using said stored global scores.

15. The method of claim 13, wherein steps (c) through (g) are repeated until a predetermined set of criteria is met.

16. The method of claim 1, wherein said step (D) further comprises a step (o), before said step (i), of reordering said formats of the consistent message.

17. The method of claim 16, wherein said step (D) further comprises the step of repeating said steps (o)–(iv) for each ordering of said formats.

18. The method of claim 16, further comprising the step of temporally aligning said subunits of each said format of the consistent message before said formats are reordered in said step (o).

19. A message recognition system for transforming a consistent message into a message recognizable by the computer comprising:

first transform means for transforming the consistent message generated by a human in at least two formats into electrical signal representations of the consistent message;

production means for producing from said electrical signal representations of the consistent message a set of parameters for each said format;

first generating means for generating a likelihood score of recognition for each said set of parameters;

training means for using said sets of parameters to train a weighting coefficient for each of the at least two formats of the consistent message, wherein said training means comprises partitioning means for partitioning the consistent message in each said format into one or more subunits, wherein each subunit corresponds to a piece of the consistent message, grouping means for grouping said subunits from each said format into a plurality of groups, wherein each group comprises one said subunit from each said format, and wherein each said subunit in one said group corresponds to the same piece of the consistent message, first determining means for determining a likelihood score of recognition for each said group of subunits, second determining means for determining a global score for the consistent message based on said likelihood scores of recognition, and third determining means for using said global score to determine said weighting coefficients, second generating means for generating a weighted expression based on said trained weighting coefficient and said likelihood scores of recognition; and second transform means for selecting a candidate message unit that maximizes said weighted expression to transform said electrical signal representations of the consistent message into a computer recognizable message.

20. The system of claim 19, wherein said production means is configured to accept input from said second generating means in order to produce a new set of parameters for each said format based on said trained weighting coefficients until a stable set of trained weighting coefficients is reached.

21. The system of claim 19, wherein said first transformation means comprises a transducer.

22. The system of claim 19 wherein said first transformation means comprises a plurality of transducers.

23. The system of claim 22, wherein said first generating means comprises producing means for producing at least two set of feature measurements from said at least two mediums, and organizing means for organizing said sets of measurements into at least two sets of feature vectors.

24. The system of claim 22, wherein said organizing means comprises at least two feature vector processors, responsive to the output of said plurality of interfaces, and configured to represent said consistent message as multi-dimensional vectors.

25. The system of claim 22, wherein said production means comprises training means, responsive to the output from said plurality of interfaces, and configured to train a set of unit models.

26. The system of claim 19, wherein said third determining means comprises means for determining said trained weighting coefficients using a deleted interpolation procedure.

27. The method of claim 19, wherein said third determining means comprises means for determining: said trained weighting coefficients using an expectation-maximization procedure.

28. The method of claim 19, wherein said third determining means comprises means for determining said trained weighting coefficients using a joint maximum likelihood procedure.

* * * * *